T. E. CALVERT.
SWITCH STAND.
APPLICATION FILED NOV. 17, 1910.

1,067,303.

Patented July 15, 1913.
5 SHEETS—SHEET 2.

Witnesses:
John Enders
Henry A. Parks

Inventor:
Thomas E. Calvert,
by Sheridan, Wilkinson, Scott & Richmond
by Geo. L. Wilkinson Attys

T. E. CALVERT.
SWITCH STAND.
APPLICATION FILED NOV. 17, 1910.

1,067,303.

Patented July 15, 1913.

Witnesses:
John Enders
Henry A. Parke

Inventor:
Thomas E. Calvert,
by Sheridan, Wilkinson, Scott & Richmond
Geo. L. Wilkinson, Attys.

T. E. CALVERT.
SWITCH STAND.
APPLICATION FILED NOV. 17, 1910.

1,067,303.

Patented July 15, 1913.
5 SHEETS—SHEET 5.

Witnesses:
John Enders
Henry A. Parks

Inventor:
Thomas E. Calvert,
by Sheridan, Wilkinson, Scott & Richmond,
Geo. L. Wilkinson Attys.

UNITED STATES PATENT OFFICE.

THOMAS E. CALVERT, OF CHICAGO, ILLINOIS.

SWITCH-STAND.

1,067,303.     Specification of Letters Patent.     Patented July 15, 1913.

Application filed November 17, 1910. Serial No. 592,851.

*To all whom it may concern:*

Be it known that I, THOMAS E. CALVERT, a citizen of the United States, residing at Chicago, in the county of Cook and State of Illinois, have invented certain new and useful Improvements in Switch-Stands, of which the following is a specification.

My invention relates to improvements in railroad switching apparatus in general, and more particularly to a switch stand of the general character covered by my prior Patents Nos. 353,664 of December 7, 1886, and 568,938 of October 6, 1896, in connection with certain modifications and accessories hereinafter described.

In the practical use of many ordinary switch stands, it sometimes occurs that they become accidentally displaced, such displacement resulting in an improper movement of the switch points, owing to their connection with the switch stand, thereby rendering liable a wrong switching or a derailment of a passing train.

The principal object of my invention is to provide, in connection with an improved switch and signal stand having independent means associated with its base for locking the switch points, a signal operating stand for controlling a distant signal and having suitable connections for interlocking with the switch controlling apparatus.

Another object is to provide a switch stand in which the position of a locking rod is interchangeable with respect to opposite sides of the stand and quadrant plate.

I also aim to furnish means for locking the switch points in a given position independently of the switch stand and which will not be affected by injury to the stand or its failure in any way to perform its regular functions.

A further object of my invention is to provide a signal operating stand which will coöperate with a main switch stand to lock the switch points in a certain position, as for the main line and continue to hold said points locked independently of the switch stand in case of disability of the latter.

Means are furnished to prevent the removal of the switch stand locking key in intermediate positions, the object being to insure due attention of the switch operator to proper setting of the lever in the process of switching.

It is especially aimed to provide separable means normally coacting with the switch stand which, independently of the stand-locking means, will retain the switch points in main line position.

Further, my invention consists in various details of construction and in combination of parts, all as hereinafter more fully set forth.

A still further object of my invention is to provide a switch stand and accessories which will be simple in construction, efficient in operation, and durable in use.

These and other objects will be made apparent in the following specification.

My invention will be more fully described hereinafter with reference to the accompanying drawings, showing a preferred embodiment, in which is represented a convenient and practical form. Most of the figures represent the apparatus set for the normal main line locked position of the switch.

Like parts are indicated by like reference numerals in the several figures of the drawings.

Reference numerals 11 and 12 indicate the rails of a railroad track at a point where a siding connects with the main line.

Figure 1:
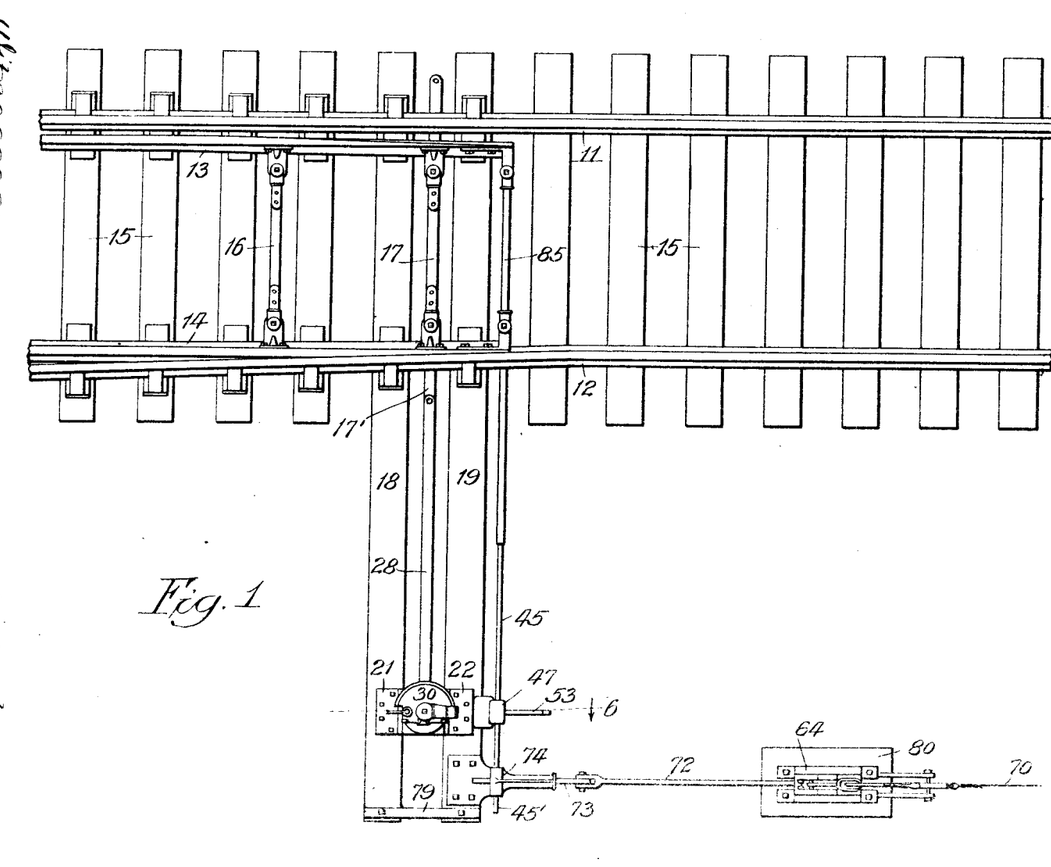
Figure 1 is a plan view of the switch stand, auxiliary signal operating stand, tracks, and switch points connected therewith.

Numerals 13 and 14 indicate the switch points, which are shown in Fig. 1 in the main line position.

The ties underlying the rails are represented by numeral 15.

Numerals 16, 17 and 85 indicate switch rods of any suitable construction for connecting the movable switch points 13 and 14. Head blocks 18 and 19 project to one side of the track and upon them the switch stand and locking rod mechanism are mounted.

Numeral 20 indicates the base of the switch stand, which is provided with downwardly and outwardly projecting feet 21 and 22. These oppositely turned feet are held in place overlying and secured to the said head blocks.

Numeral 23 designates a crank shaft located vertically within the base 20. This shaft is held so as to oscillate on its vertical axis by means of the web 24, through which the shaft passes adjacent its lower end and by means of the reduced upper end 20' of the base which closely surrounds the shaft near its upper end. The weight of the shaft is supported by an oscillatory lower hub element 25 to which the shaft is fixedly attached at its upper end, as hereinafter set forth. The portion of the shaft 23 beneath the web 24 lies closely adjacent the web and is provided with a crank arm 26, the depending outer end 27 of which extends loosely through a vertical opening in the outer end of a connecting rod 28, the opposite end of the latter being connected to a projection 17' of the switch rod 17 extending beneath the rail 12. The end of the connecting rod 28, which extends beneath the base 20, is supported upon a strap 29, and is thereby retained in coupled relation with the depending end 27 of the crank arm 26. The strap 29 extends between the head blocks 18 and 19, and is provided with upwardly projecting ends secured to the feet 21 and 22 of the base 20 on its trackward side in any suitable manner, as by casting the feet of the base around the ends of the strap. Straps may be on both sides so as to facilitate interchangeability.

The connecting rod 28 is put in place by inserting the crank end under the stand over the strap 29 and resting on said strap, but with the track end raised, thus permitting the crank end to go under the said depending end 27 of the crank arm 26 so that when the track end of rod 28 is lowered the crank tip 27 will enter the vertical opening in the crank end of rod 28. The track end of the connecting rod may then be attached to 17' on the switch rod 17.

Figure 8:
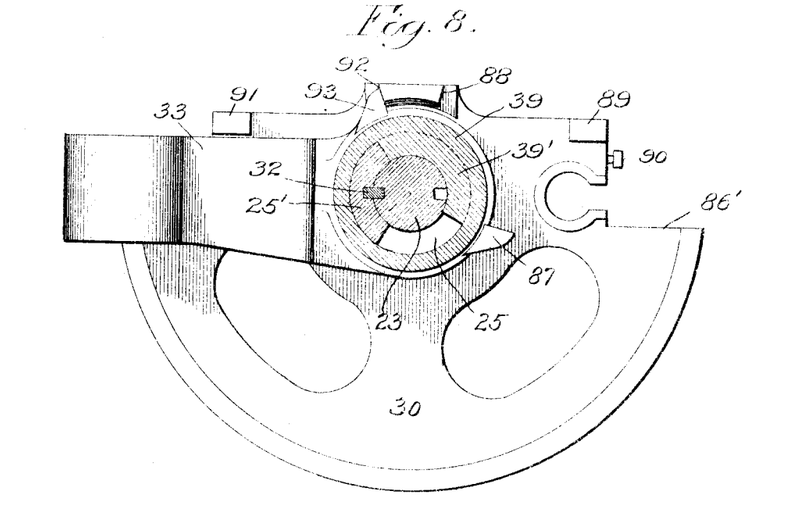
Fig. 8 is an enlarged horizontal sectional view, of the main switch stand, taken on line 8 of Fig. 6.
Figure 9:
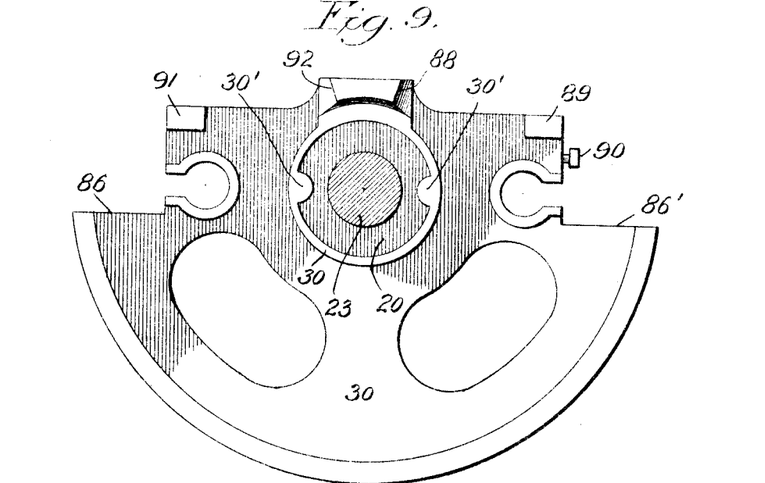
Fig. 9 is an enlarged horizontal sectional view, of the main switch stand, taken on line 9 of Fig. 6.

Numeral 30 indicates a quadrant plate, which is secured upon the upper end of the base 20, by means of a depending flange 31 having a conical opening therein, in which is received the conical upper end 20' of the base 20. In order to prevent rotation of the quadrant plate relatively to the base, interlocking ribs and grooves are provided, such as shown at 30' in Fig. 9 and indicated by dotted lines in Fig. 6. A lower hub casting 25 is located above and slidably pivoted upon the quadrant plate 30. It is rigidly fastened to the shaft 23 in any suitable manner, as by means of a key 32 shown in Figs. 6 and 8. Projecting laterally from the lower hub casting 25 is a lever 33 having therein a chamber, in which is received the upper end of a handle 34. A pivot pin 35 extends through registering openings in the end of the handle within the chamber in the lever 33 and in the adjacent walls of said chamber.

Figures 6, 7:
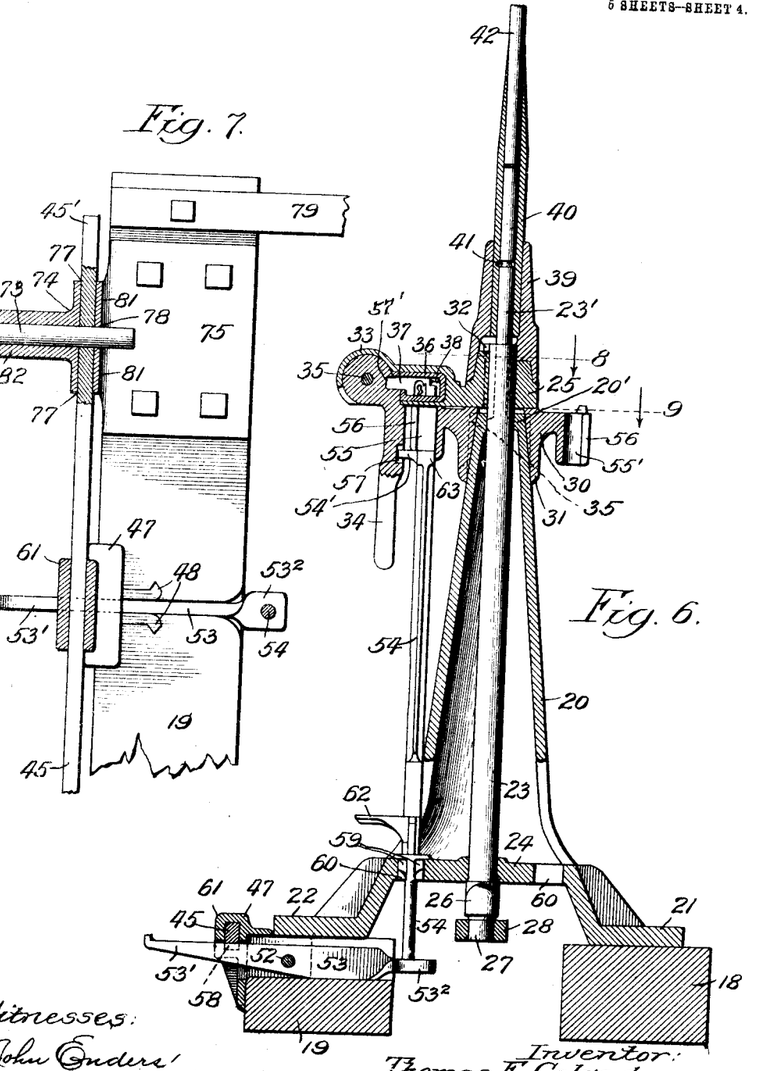
Fig. 6 is an enlarged vertical axial section, taken on line 6 of Fig. 1, facing away from the track.
Fig. 7 is a plan view of the outer end of the head block on which a foot lever, locking rod and auxiliary lock are shown mounted.

Located within the chamber just back of the handle 34, in the lever 33, is a lock of ordinary key and plunger construction, comprising a casing 36 and plunger 37. A spring 38 is interposed between the plunger and the casing, the tension of which projects the outer end of the plunger against the adjacent surfaces on the lever 33. A recess 57' is provided in the lever, into which the locking plunger is normally projected by the spring when the lever is in a depending position, as shown in Fig. 6. Just above the lower hub element 25 and having rotatory bearing therein is an upper hub casting 39 having a downwardly turned open chamber in which is received the upper portion of the lower hub 25. The upper part of hub 39 is hollow and surrounds the lower end of a short section of tubing 40 and is rigidly secured thereto by means of a transverse pin 41, extending partially within an annular groove in the upper reduced end 23' of the shaft 23, such reduced end projecting upwardly within the tube 40.

Numeral 42 designates the target mast, which rotatably abuts nearly upon but preferably slightly out of contact with 23' of shaft 23 and which is surrounded by and rigidly secured to the upper portion of the tube 40, preferably by means of welding.

Figures 2, 3, 10:
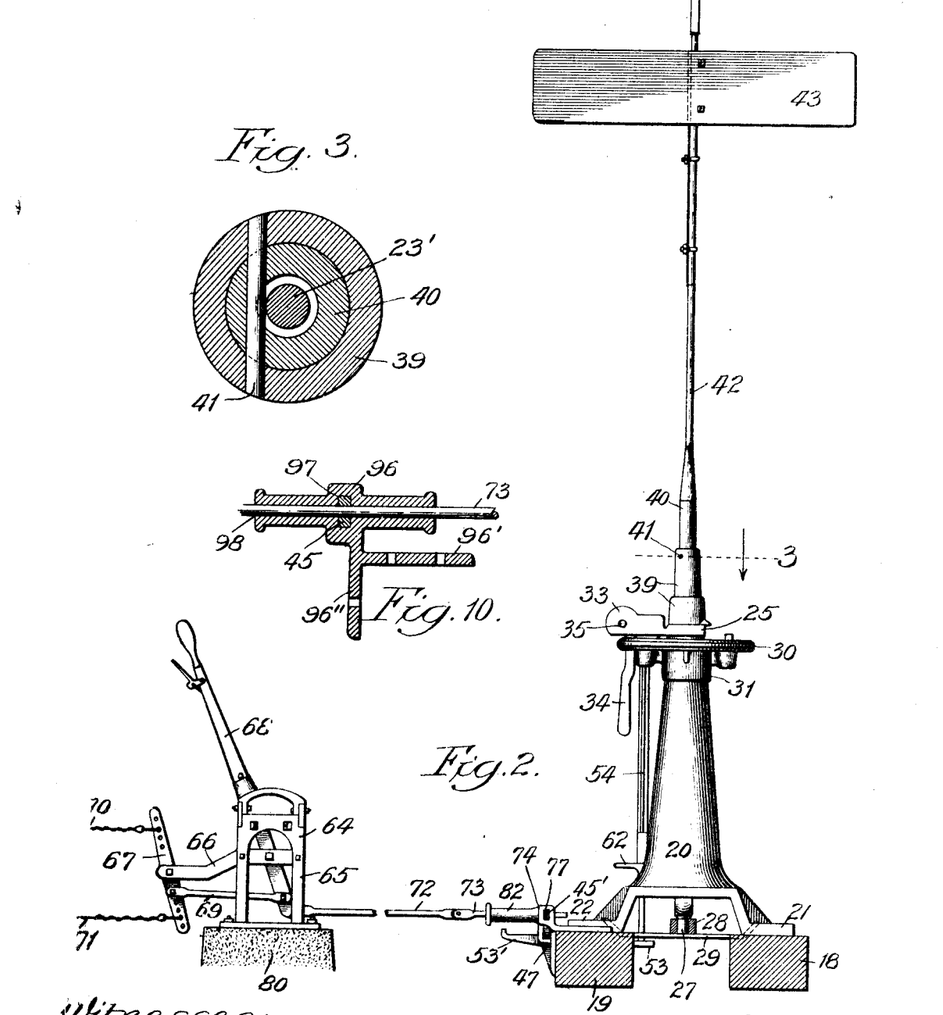
Fig. 2 is a front elevation view of the main switch stand, auxiliary signal operating device and interconnecting lock mechanism, part of which is shown in section. This view is looking crosswise of the track.
Fig. 3 is an enlarged sectional view, taken on line 3 on the main stand of Fig. 2.
Fig. 10 is a modification of part of Figs. 2 and 7.
Figures 4, 5:
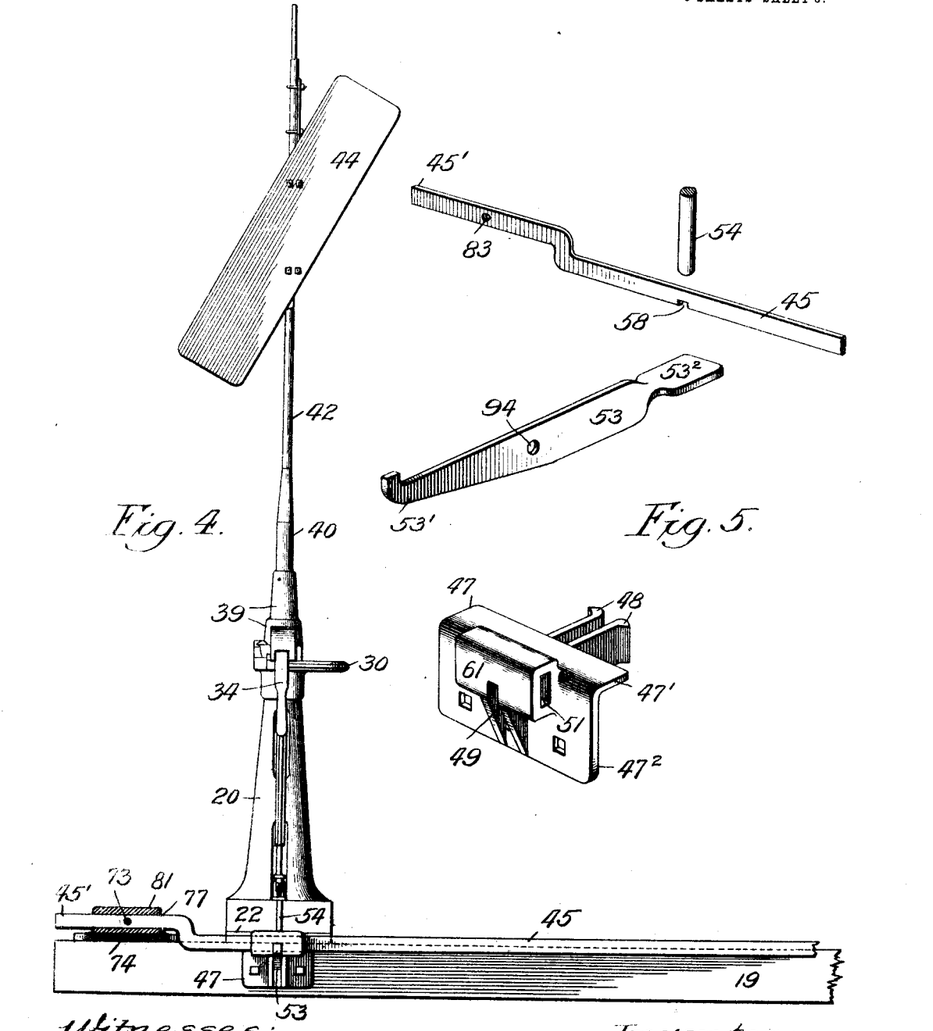
Fig. 4 is a side elevation view of the main switch stand, looking from the right of Fig. 1.
Fig. 5 shows, separately, the several chief members of a foot-operated independent point-locking device adjacent the main stand.

The siding target is indicated by 43 and the main line target by 44. These targets lie in planes at right angles to each other and are rigidly secured to the mast 42 in any suitable manner, as by means of U-bolts, as shown in Figs. 2 and 4, where the main line position is shown. The weight of the upper hub element 39 and all parts attached thereto, as the sleeve 40, mast 42 and the targets, is normally carried by the lower edge-bearing of hub 39 on the lower hub 25.

In order that the switch points may be retained in main line position independently of the locking mechanism of the switch stand proper, I provide the following supplemental locking mechanism, so that in case the switch stand should be accidentally injured or displaced the switch points will remain firmly locked in main line position. A locking rod 45 extends outward from the track past one side of the switch stand and is connected at the track end by suitable means with the switch point 14, ordinarily and preferably at the extreme tip end of said point. The outer end of the locking rod 45 passes through a foot lever locking frame 47 set into and attached to the outer side of one of the head blocks, as 19, adjacent the switch stand. This frame 47 preferably comprises two flanges 47′ and 47² at right angles and adapted to engage the upper edge of a head block. In connection with the horizontal flange 47′ is a pair of guide and fastening wings 48 slightly spaced apart, as shown by Fig. 5. Extending upward from the outer side of the vertical flange 47² is a box-like projection 51 having a longitudinal passage 51 therethrough adapted to receive the outer end of the locking rod and permit it to reciprocate therein. The vertical flange 47² has a vertical slot 49 extending upward from near its under side and into the lower edge of passage 51 in alinement with the space between the said wings 48. In the space between the wings 48 is placed a pivot 52 on which is mounted a foot lever 53 adapted to oscillate vertically within the said space and slot of frame 47. This lever 53 extends outwardly at one end 53′ where it is adapted to be actuated downwardly by foot pressure. At the other end, it extends through the upper part of the head block and under the switch stand to a point 53² in alinement with a vertical locking rod 54. This locking rod 54 normally rests upon the inner end 53³ of lever 53 and holds it depressed. It extends upward through openings 60 in the web 24 and base 20 and into engagement with a cylindrical guide element 55 dependent from the quadrant plate 30. The upper end of this rod 54 has a lateral lug 54′ adapted to slide in the vertical slot 56 in the wall of the guide.

The quadrant lever handle 34 is provided near its middle part with a recess 57 adapted to engage and hold the lug 54′, when the rod is lowered and the lever is in its locked position, as shown in Fig. 6. When thus locked, the rod 54 resting on the inner end of lever 53 holds it depressed with the outer end of said lever raised and in engagement with a notch 58 in the under side of the said locking rod 45. This notch 58 is preferably so located on the rod 45 as to engage the lever 53 when the switch points are in the main line position, and then only. Hence, the switch stand can be locked and the key removed only when the switch points are in the main line position. Moreover, the lever 53, because of its inner arm being longer and heavier than its outer or foot arm, will naturally tend to hold the lock rod engaged, even were the rod 54 to fail. In order further to insure retention of engagement of end 53′ with notch 58 a spring may be used. A collar 63 on the upper end of the vertical rod 54 serves to guide it within the dependent element 55. This rod 54 is also provided with suitable guide flanges 56 to engage the opening through the base web 24. There is preferably attached to the rod 54 at a point slightly above the web 24 a projection or step 62 adapted to be depressed by the foot of the operator in case the apparatus sticks, though the weight of the rod is generally sufficient to hold it down, except when the outer end of lever 53 is depressed by the foot of the operator. The weight is not so great, however, as to prevent the rod 45 from sliding freely over the lever 53 when the latter has disengaged the notch 58.

Adjacent to the main switch stand above described is a signal operating stand of ordinary general construction adapted to control a distant signal. It is also adapted to coöperate with the main stand, with which it is connected by interlocking mechanism described herewith to control the locking of the switch points. The signal operating stand consists generally of a fixed frame 65 mounted on a suitable foundation 86, a fixed pivot pin 69, a lever 67 pivoted at its center on the outer end of said pivot, arm 66 and supporting strands 70 and 71, a hand lever 68 pivoted at the inner end of said arm 66 and a link 69 connecting the lower arm of lever 67 to the lower arm of lever 68, as shown in Fig. 2. Extending backward from the signal stand 65 is a bar or link 72 connecting the lower end of lever 68 on the signal stand with a plunger 73 contained in an auxiliary interlocking frame 74 which is mounted alongside of the foot lever frame 47 preferably, preferably on the extreme outer end, as shown in Figs. 1 and 2. The said accessory frame 74 is adapted to be mounted on an upper corner of a head block and consists generally of a horizontal flange 75, and an upwardly projecting portion having a horizontal T shape. The head part 81 of this T element has an opening 77 extending throughout its length parallel to the head block. The body part 82 of the T element has an opening 78 of relatively small diameter extending throughout its length and intersecting opening 77. Both of the said cavities in this frame 74 serve as guides for reciprocating parts. The opening in 81 is adapted to receive the outer end 45′ of the locking rod 45. The said plunger 73 fits in the opening in 82 and is reciprocated therein by the signal stand shaft 72. When the switch points are in the normal main line position, the plunger 73 in cavity 78 passes through the hole 83 in the outer end 45′ of the locking rod and holds it securely in place. Then when the lever 68 is thrown the other way, the plunger 73 is withdrawn. This leaves the locking rod 45 held only by the foot lever 53. This serves as a double check on the switch rod.

The signal stand 64 is provided to operate signals at a distance from the switch and switch stand. This is accomplished mechanically by means of a pair of wires or strands 70 and 71 attached to opposite ends of the lever 67, as shown. The distant ends of these wires are attached to any suitable signal mechanism, as a lever similar to 67, in accordance with methods already well-known. This enables the switch operator to display an auxiliary signal at a sufficient distance from the switch to enable the engineer of an approaching train to stop his train before reaching the switch.

The interlocking mechanism above described prevents the possibility of opening the switch without first setting the distant signal accordingly. Moreover, the distant signal cannot be restored to the main line position until the switch has actually been so set.

The operation of my improved switch stand and interlocking device is as follows: When the parts are in the position indicated in the drawings, the switch points are locked in main line position and the main line target 44 occupies a plane transverse to the direction of the track. In order to throw the switch points to siding position the first step is to set the distant signal by means of throwing lever 68 of the controller stand 64. This releases the rocking rod 45 from engagement with pin 73 in frame 74. The key is then inserted in the lock carried by the switch stand lever 33 and the plunger 37 withdrawn from engagement with the recess 57' in the head of the handle 34. The handle 34 is then swung upwardly past the shoulder 86 on the quadrant plate, so that the circular cam surface on its head will engage the plunger 37 and retain the same retracted, thereby preventing the withdrawal of the key as long as the lever is in such position, the construction of the lock being such that the key cannot be inserted or withdrawn except when the lock is in its normal locked condition. As this lock construction is already well known in the locksmith's art, it is not fully described herewith or claimed as new. As soon as the handle 34 is raised the operator places his foot on the outer end of the auxiliary locking lever 53 and depresses it, thus disengaging same from the locking rod 45. This is permitted by the fact that the handle 34 having been swung outwardly has disengaged the lug 54' from the recess 57 and so allows the bar 54 and lever end 53' to rise. The handle 34 is then moved along the quadrant plate, and such movement of the handle is imparted to the lever 33 and the lower hub casting 25 and thence to the crank shaft 23 connecting rod 28 and switch points. The said handle, lever, lower hub and crank shaft all turn together through an angle of 180 degrees. Coincident with this movement certain other members, namely, the upper hub, the tube 40, the mast 42 and the targets are turned only 90 degress or just half as far as the handle turns, as will be further explained. When the turning is complete handle 34 drops down behind shoulder 86'.

In order to close the switch and bring the points to main line position a routine substantially the reverse of the above must be followed. First the handle 34 is swung into horizontal position, so as to pass above the shoulder 86' in the quadrant plate. It is then moved through 180° until lug 93 on the upper hub engages stop lug 92 on the quadrant plate and the lever 33 engages the stop lug 91 on the other side, whereupon the handle may be swung downwardly past the shoulder 86 into the position shown in Fig. 6, in which the handle is locked by the plunger 37 and in turn locks the rod 54 against rising through the engagement of the lug 54' within the recess 57, the locking rod 45 having been returned to locking position by the movement of the switch points, so that the outer end of lever 53 has been permitted to rise and enter the notch in the under side of said locking rod, thus depressing the inner end where the rod 54 rests, and permitting the rod 54 to fall. In case of any tendency of the rod 54 to stick the foot may be applied to step 62. The next step is to set the distant signal in the main line position and further lock the rod 45. This is done by throwing lever 68 outwardly thus operating the tension strands 70 and 71 and thrusting plunger 73 into engagement with rod 45. This can be done only when the switchpoints are in their proper place, for if out of place, the hole 83 will not register with the plunger. Referring again to the moving parts of the switchstand proper it should be observed that the exact time of movement of hub 39 with respect to hub 25 is not absolutely fixed, but depends somewhat on adjustment and speed of operation. Generally speaking, if the two hubs have an ordinary bearing fit one upon the other the inertia of the upper elements will not be sufficient to prevent the hubs turning together during the first 90 degrees. If, however, the lever is turned suddenly, so as to overcome friction or if by any chance in adjusting the parts, in the process of assembling a large part or all of the weight of the upper hub and mast rests pivotally on the upper end of shaft 23' they would tend to lag 90° behind the lower hub especially if the latter were turned quickly, and would not move appreciably until the lever had moved through 90°, whereupon lug 28' would engage lug 39' and force the upper hub around until stopped by engagement of lugs 87 and 88. Practically, it is immaterial whether the parts all start together or not, since the final results are the same. Therefore, since the former condition is most common and suffices the purpose of this specification same will be described in full.

After the handle 34 has been released by the lock and has been raised clear of the shoulder 86 it is moved laterally carrying the lever 33 half way around its pivot along the quadrant plate 30. Such movement is imparted to the lower hub 25 and thence to the crank shaft 23. The upper hub 39, tube 40 and mast 42 which rest upon the aforesaid moving members are also carried around part way by virtue of resting on the lower hub element. After a movement of the lower hub 25 through approximately 90°, normally carrying with it the upper hub 39, a lug 87 on the upper hub engages a stop shoulder 88 on the back side of quadrant plate 30, as may be seen by Fig. 8. This stops the movement of the upper hub, but does not stop the lower hub in its movement through its full swing from one side to the other. Hence a continued movement of the handle 34 along the quadrant plate 30 continues to rotate the lower hub 25 and consequently continues to move the switch points. The movement of the handle 34 continues through 180°, at the limit of which angle the lever 33 engages the stop lug 89 on the quadrant plate, such total movement of the handle having rotated the shaft 23 180° and completed the throw of the switch points, and also having rotated the mast 90°. The handle 34 then drops down behind shoulder 86 and prevents retrogressive movement until the handle is again raised. The handle 34 may be locked here, but preferably a set screw 90 is used to prevent it, by preventing the movement of handle 34 downward into locking position. When the lever 33 comes into engagement with the stop 89, the upwardly projecting shoulder or lug 28' on the lower hub comes into contact with a similar lug 39' on the upper hub, thereby holding the said upper hub in opposition to any tendency to turn back and give a false signal before the lower hub is released. If it is desired to permit the switch points to be locked in siding position, the screw 90 in the quadrant plate is removed, thereby permitting the handle 34 to continue its swing downwardly past the shoulder 86 on the quadrant plate into position far enough to permit the plunger 37 to engage the recess in the head of the handle, thereby permitting the key to be withdrawn. When it is desired to prevent the switch points being locked in siding position, the screw 90 is secured to the quadrant, thereby preventing the handle 34 from being swung downwardly sufficiently far to permit engagement of the plunger 37 with the recess 57 and the removal of the key.

In order to enable the most compact and inexpensive construction of my switch stand it is preferable to locate the vertical locking rod 54 relatively near the crank shaft, which makes it necessary to have the crank arm on the opposite side so as to avoid swinging against the said rod 54. Therefore, since it is always necessary for the locking rod 45 to connect to the extreme tip of the rail points, provision must be made for placing the rod 45 on either side of the stand so as to permit its use with switches opening either to the right or to the left of the stand. I have, therefore, provided for making the position of the locking rods 45 and 54 interchangeable on either side of the stand, that is to say, they may be secured on either side. I have also made the auxiliary locking frames 41 and 71 so that they can be mounted together with or either side of the stand. The arms 76 on the quadrant plate are likewise so mounted on either side of plate 30, so as to prevent locking of handle 34 at the open switch position, on whichever side the locking rods are located.

Economy of material and space generally makes it desirable to place the stand relatively close to the track. Hence safety for the operator requires that the stand face outward, though this is not absolutely necessary where the head blocks are long enough to set the stand well out from the track. The bent strap however, must always be on the side of the stand toward the track. This can be insured by having a strap on each side or by making a single strap interchangeable with respect to the said side. The shaft 23 is attached to hub 25 by means of a key 22 placed in a vertical slot in hub 25 and one of the corresponding oppositely placed slots 95 or 96 in the shaft 23. The weight of the shaft is therefore carried largely direct upon hub 25 by means of said key, but part of it is carried indirectly through the pin 41 and the upper hub 39.

In order to change my stand so as to open in the reverse direction it is necessary to first, move the auxiliary locking frames to the opposite side of the head blocks, second, to move the locking rods 45 and 54 to the opposite side of the stand, third, to remove key 22 from engagement with hub 25 and shaft 23, turn the shaft 180° so that the other key slot on the opposite side of the shaft 23 will register with the hub slot, and then reinsert the key 22, and fourth, to turn the vanes 90° either one way or the other, depending on which change is being made, as may be done by loosening the U-bolts that hold them to the mast and then fastening them in the new position. A modified form of locking frame for use in connection with the signal stand 64 is shown in Fig. 10. This frame 96 comprises a horizontal flange 96' and a vertical flange 96² adapted to engage a head block and a horizontal cross shaped body extending upward therefrom and in which are two intersecting chambers 97 and 98 extending therethrough, the former adapted to receive the rod 45, and the other the plunger 73. This enables mounting the stand 64 on either side of the frame 96. These variations of detail are of a simple nature that may readily be seen by reference to the drawings without special illustration.

From the foregoing description it will be observed that I have invented an improved interlocking system including a switch stand and accessories which not only comprise mechanism for throwing the switch points and retaining them locked in either main line or siding position, but also comprise a dual supplemental locking device supported independently of the switch stand and separately connected to the switch points, so as to positively retain such switch points locked in main line position, regardless of any accident which may happen to the switch stand. It will be further observed that such supplemental locking device cannot be operated except after a distant signal has been set and the handle of the switch stand has been unlocked, and hence the switch points are triply locked and can only be unlocked by one having the key to the switch stand lock.

While I have described more or less in detail the particular embodiment of my invention illustrated in the drawings, yet it will be understood that many modifications may be made by those skilled in the art without departing from the spirit of my invention. Therefore, I do not wish to be understood as limiting myself to any specific embodying structure, but desire to cover any structure embodying my invention as defined by my claims.

I claim:

1. In a device of the class described, a switch rod connected to a switch point, means to operate said switch rod, a locking rod connected to said switch point, means normally engaging said locking rod to prevent opening of said switch point, and means coacting with said engaging means to hold the same locked in engagement with said locking rod, said coacting means being provided with means whereby the operator can force said engaging means into engagement with said locking rod.

2. In a device of the class described, a switch stand, a switch rod connected to a switch point, means carried by said switch stand to operate said switch rod, a locking rod connected to said switch point, a lever located adjacent said switch stand pivoted intermediate its extremities and adapted to normally engage said locking rod when said switch point is in closed position, a rod carried by said switch stand co-acting with said lever to normally hold the same in engagement with said locking rod, and means carried on said last named rod to enable an operator to operate the same to force said lever into engagement with said locking rod.

3. In a device of the class described, a switch stand, a switch rod connected to a switch point, means carried by said switch stand to operate said switch rod, a locking rod connected to said switch point, a lever located adjacent said switch stand pivoted intermediate its extremities and adapted to normally engage said locking rod when said switch point is in closed position, a depressing rod carried by said switch stand coacting with said lever to normally hold the same in engagement with said locking rod, means carried on said depressing rod to enable an operator to operate the same to force said lever into engagement with said locking rod, and means to lock said depressing rod when said lever is in engaging position with said locking rod.

4. In a device of the class described, a switch stand, a switch rod connected to a switch point, a rotatable crank carried by said switch stand and having a crank arm engaging said switch rod, a locking rod engaging said switch point and having a notch formed therein, a lever pivoted intermediate its extremities and located adjacent the base of said switch stand, said lever being adapted to normally engage the notch in said locking rod to prevent movement thereof when said switch point is in closed position, a depressing rod carried by said switch stand and adapted to coact with one extremity of said lever to force the same into engagement with said locking rod, said depressing rod being formed with a projection thereon to enable an operator to forcibly depress the coacting extremity of said lever.

5. In a device of the class described, a switch stand, a rotatable crank carried by said switch stand, said crank being formed with a crank arm at its lower extremity, a switch rod engaged by said crank arm and connected to a switch point, a locking rod secured to said switch point and rotatably mounted adjacent said switch stand, said locking rod being notched, a lever pivotally mounted below said switch stand and in proximity thereto, said lever being located approximately at right angles to said locking rod and projecting beyond to form an engaging portion, said lever being adapted to engage the notch in said locking rod when said switch point is in closed position, a depressing bar carried by said switch stand and adapted to hold said lever in engagement with the notch in said locking rod when in depressed position, and means to lock said depressing bar when in depressed position.

6. In a device of the class described, a switch stand, a rotatable crank carried by said switch stand, said crank being formed with a crank arm at its lower extremity, a switch rod engaged by said crank arm and connected to a switch point, a locking rod secured to said switch point and rotatably mounted adjacent said switch stand, said locking rod being notched, a lever pivotally mounted below said switch stand and in proximity thereto, said lever being located approximately at right angles to said locking rod and projecting beyond to form an engaging portion, said lever being adapted to engage the notch in said locking rod when said switch point is in closed position, a depressing rod carried by said switch stand and adapted to hold said lever in engagement with the notch in said locking rod when in depressed position, means to lock said depressing bar when in depressed position, and a foot-engaging projection carried by said depressing bar, whereby an operator may force said depressing bar downwardly to force said lever into locking engagement with said locking rod.

7. In a device of the class described, a switch stand, a switch rod connected to a switch point, a locking rod also connected to said switch point, a socket member located adjacent said switch stand, said locking rod being movably mounted in said socket, a locking lever adapted to engage and lock said switch rod in said socket, and foot depressible means to remove said lever from locking engagement with said rod.

8. In a device of the class described, a switch stand, a switch rod connected to a switch point, a locking rod also connected to said switch point, a socket member located adjacent said switch stand, said locking rod being movably mounted in said socket, means coacting with said socket to lock said locking rod against movement, a second socket member spaced from said first named socket member, said locking rod being also movably mounted in said second named socket, and means coacting with said second named socket to lock said rod in engagement therewith.

9. In a device of the class described, a switch stand carried on head blocks, a switch rod connected to a switch point, a locking rod also connected with said switch point, a socket movably mounted adjacent said switch stand, one of said feet, the second ably mounted in both of said sockets, means coacting with said first named socket to lock said locking rod in engagement therewith, and a second locking means coacting with said second named socket member to lock said locking rod in engagement therewith.

10. In a device of the class described, a switch-stand having a vertical crank shaft dependently supported by suitable means and retained laterally by a frame web in the base of said stand closely adjacent the upper side of its oscillable crank arm at its lower end, said arm having a downwardly turned pivot tip adapted to engage a vertical opening in the outer end of a reciprocable connecting rod, the other end of which is attached to a switch point, said base having two oppositely extending feet adapted to rest on a pair of head blocks, said feet having means on each side, front and rear, for mounting an interchangeable connecting rod support strap adapted to extend between said feet on the side toward the track and support the stand end of said connecting rod.

11. In a device of the class described, a switch stand having a downwardly turned crank pin engaging the vertical eye of a connecting rod, said stand being adapted to mount facing either toward or away from the track, and means to attach a connecting rod support strap to said base.

12. In a device of the class described, a switch stand having an open base, a vertical crank shaft having a crank at the lower end bearing a downwardly turned pivot at the outer end, a shaft bearing adjacent the crank, a connecting rod adapted to engage with said crank pivot, and means adapted both to support the said rod in engagement with said pivot under normal conditions and to permit disengaging it therefrom when the other end of the said rod is disengaged.

13. In a device of the class described, a switch stand having an open base, a vertical crank shaft having at its lower end a crank arm on the outer end of which is a depending crank pin, a shaft journal immediately above said arm, a detachable connecting rod engaging said crank pin and connected to a switch point, and a support element attachable to said base and adapted to support the crank end of said rod in all of its normal working positions and to permit disengaging said rod from said pin when the crank is turned away from the track and the trackward end is disconnected and raised.

14. In a device of the class described, a switch stand having a duplication of perceive and coact with an interchangeable rod for engaging the lever arm carried by said quadrant on either side of the said stand, said rod being adapted at its upper end to lock with said arm and at its lower end to engage a locking rod mechanism.

15. In a device of the class described, a switch stand adapted to open and close a switch point and having a lock adapted to hold same in a definite position, a fixed frame mounted adjacent said stand, a locking rod connected at one end to said switch point and reciprocably engaging said frame, a lever pivoted in said frame, said lever normally engaging mechanism in the said stand and held rigidly thereby subject to control of the said stand lock, and also locking with said rod at a definite point.

In testimony whereof, I have subscribed my name.

THOMAS E. CALVERT.

Witnesses:
F. W. RIZER,
CHAS. W. BREED.